United States Patent [19]

Cavazos

[11] Patent Number: 4,976,195
[45] Date of Patent: Dec. 11, 1990

[54] COMBINATION BREAD AND TORTILLA TOASTER

[76] Inventor: Amado F. Cavazos, 302 Wyndale, San Antonio, Tex. 78209

[21] Appl. No.: 521,608

[22] Filed: May 10, 1990

[51] Int. Cl.⁵ .............................................. A47J 37/08
[52] U.S. Cl. ...................................... 99/391; 99/390; 99/393
[58] Field of Search ................ 99/385, 389, 390, 391, 99/392, 393, 396, 402, 399, 332; 219/521, 537; 126/25 A, 41 R, 14

[56] References Cited

U.S. PATENT DOCUMENTS

| 1,948,739 | 2/1934 | Wolcott et al. | 99/390 |
| 2,788,734 | 4/1957 | Weeks | 99/390 |
| 2,865,282 | 12/1958 | Brown et al. | 99/390 |
| 2,916,984 | 12/1959 | Strauss | 99/390 |
| 3,531,231 | 9/1970 | Kawamura | 99/393 |
| 3,588,855 | 1/1971 | Stanek et al. | 99/385 |
| 4,590,849 | 5/1986 | Uemura et al. | 99/391 |

Primary Examiner—Timothy F. Simone
Attorney, Agent, or Firm—Cox & Smith Incorporated

[57] ABSTRACT

A combination electric toaster for reheating either conventional sliced bread or tortillas. A tortilla is a very thin slice of unleavened bread which is usually circular and significantly larger in overall length than conventional slices of bread. The alternate between toasting sliced bread and tortillas, a depth adjusting mechanism and a side support adjustment mechanism is used concurrently.

5 Claims, 3 Drawing Sheets

COMBINATION BREAD AND TORTILLA TOASTER

BACKGROUND OF THE INVENTION

This invention relates to automatic electric toasters for reheating baked goods and, more specifically, but not by way of limitation, to a combination sliced bread and tortilla toaster. A tortilla is a very thin slice of unleavened bread. They are usually circular and significantly larger in overall length than conventional slices of bread. Standard toasters available cannot toast tortillas because of this narrow width and large diameter. Prior art discloses several efforts to make toasters accommodate varying thicknesses and shapes of bread, but none have attempted to accommodate for the unique features of tortillas.

For instance, U.S. Pat. No. 2,788,734, issued to Weeks, discloses a toaster which has slots that can be enlarged to toast buns which are substantially thicker than conventional sliced bread. The mechanism taught by Weeks '734 cannot reheat thin pieces of baked goods, such as tortillas, because its design limits the width of its slot to the minimum width of conventional sliced bread. U.S. Pat. No. 2,865,282, issued to Brown et al., discloses another effort to produce toasters with variable slot widths. This design simply does not allow for heating of very thin slices of bread, such as tortillas. Neither of these patents takes into account the possibility of heating tortillas, as the designs do not allow for the narrow width, the "floppy," non-rigid nature, and the relatively larger diameters of tortillas. The present invention discloses dual internal mechanisms which narrow the gauge width of slots and enlarge the overall length of the heating compartments.

The size of the average bread toaster in general use today varies, but is normally just high enough for the usual slices of bread which are squares of approximately four inches on each side. Prior art does not provide for a toaster which is designed to be varied in internal dimensions to enable toasting of a "standard" slice of bread then convert to warming or toasting of lengthier tortillas. The primary feature of the present invention is its ability to switch from dimensions accommodating the shorter, wider bread slices to ones of the much longer and much narrower tortillas and still permit easy access to the heated products after they "pop up" from the toaster. Additionally, the non-rigid nature of a tortilla requires sensitive dimensional adjustability in slot spacing and a heat temperature varying means to avoid burning the thin tortilla.

Tortillas have traditionally been popular in the Southwest region and have only recently been widely accepted throughout the United States. The widescale acceptance has been due to an increasing demand for Mexican food by the "Anglo" segment of the population. With ever increasing numbers of Mexican restaurants, more and more people have been exposed to foods such as tortillas. This exposure has overflowed into domestic kitchens, and tortillas are readily available in the frozen-food sections of most major supermarket chains. However, warming tortillas is a constantly re-occurring problem encountered in both restaurant galleys and domestic kitchens.

Tortillas are best served hot and present methods to warm them include horizontal heaters, conventional ovens, mini-grill stoves and microwave ovens, none of which are entirely satisfactory or convenient. This is especially true in the domestic dining room. Standard bread toasters were invented as an answer to the inconvenience of toasting regular bread slices in the kitchen and the desire to have counter or table-top machines which could toast bread simply and efficiently. The present invention, likewise, is directed towards convenience, simplicity, and ease of heating tortillas, while retaining ability to toast regular bread.

Because of the ever increasing Hispanic poPulation and the ever increasing demand for Mexican food among non-Hispanic peoples, this apparatus will become a common household item.

SUMMARY OF THE INVENTION

The standard tortilla on the market today is about seven inches in diameter and less than ⅛ of an inch thick. The standard sliced bread is in the form of a square four inches long on each side and about ½ to ¾ of an inch thick. To accommodate both sliced bread and tortillas, the present invention is approximately three inches taller and three inches longer than a standard bread toaster. The width (the three-dimensional depth) of the present invention does not have to vary from conventional toasters.

To accomplish the switch between the "bread mode" and the "tortilla mode," a first lever or knob is placed on one external side of the apparatus. The lever connects to an internal mechanism which is designed to vertically drop or raise a slotted platform. The platform holds a regular slice of bread in the "bread mode," and when dropped to the lower "tortilla mode" holds a lengthier tortilla. Because of the thin width of the tortilla, merely dropping the level of the platform will cause the tortilla to collapse or buckle and heat unevenly, burning areas too close to the heat source.

Prior art reveals the use of mechanisms to widen conventional toaster slots so that baked goods wider than regular sliced bread can be heated without burning or getting stuck in a narrow heating chamber. Prior art, however, fails to teach methods to convert or alternate from heating short length, broad width slices to larger length, thin width slices of bread.

To address this gap in prior art, the first lever is supplemented with a second lever which is also placed on one external side of the apparatus. The second lever connects to a second internal mechanism which is comprised of a plurality of "baskets." The second internal mechanism moves a series of frames which make up the baskets closer together to form narrow side supports for the thin tortillas. The baskets are designed to alternate between a wider configuration which holds conventional sliced bread to a narrower configuration which optimallY holds floppy tortillas, preventing collapse. This unique basket system in its narrower configuration holds the tortillas at an optimum distance from the heating elements preventing uneven heating or burning.

There is a wide possibility of different configurations, arrangements and design changes which one skilled in the art could adapt to the present apparatus and accomplish the same results. All these possibilities are included within the spirit of the present invention. Other objectives, features and advantages of this invention will become evident in light of the following description of the invention.

DETAILED DESCRIPTION OF THE PREFERRED EMBODIMENT

Figure 1:
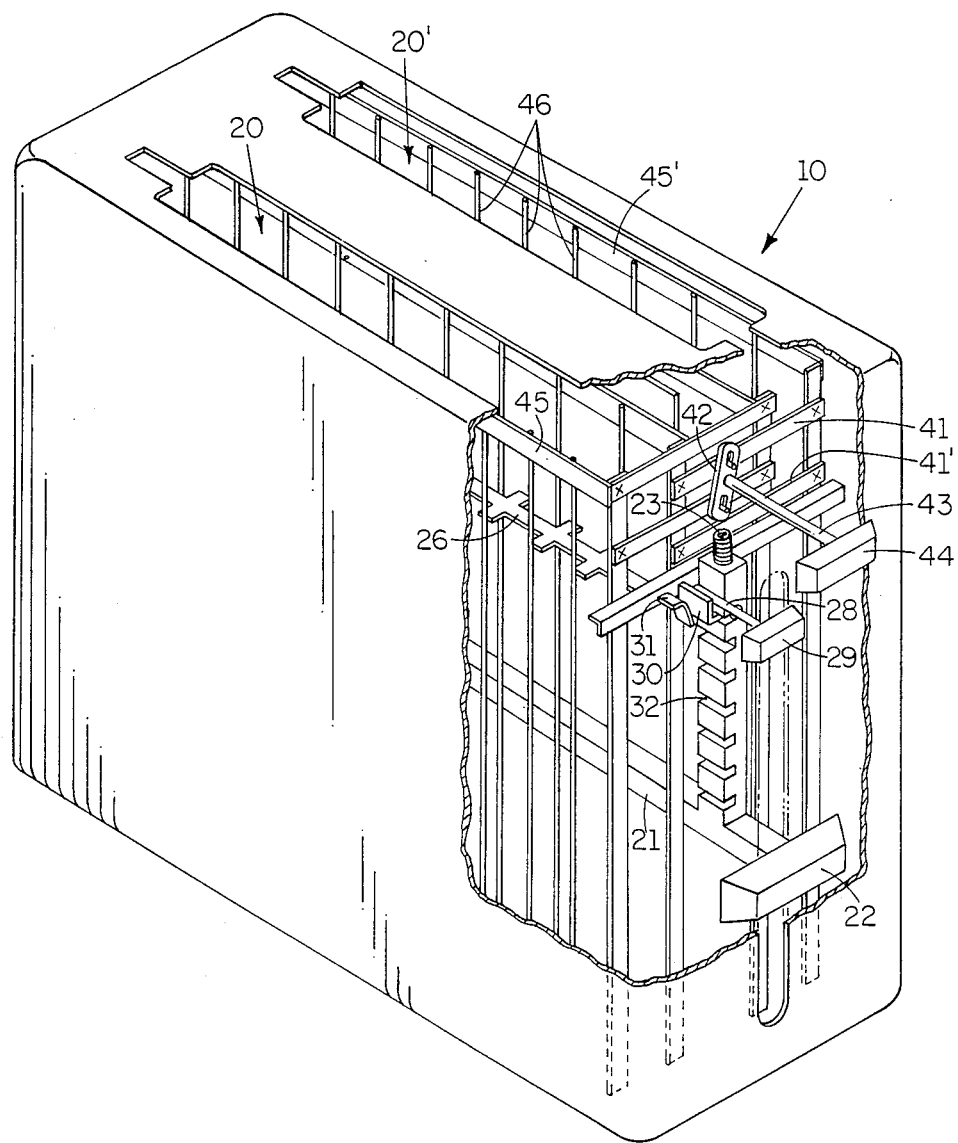
FIG. 1 is a perspective view of one embodiment showing a cut-away portion into the interior of the toaster.

FIG. 1 depicts a cut-away portion into the interior of the toaster showing the internal depth adjustment mechanism and side support adjustment mechanism and their proximity to one another.

Figure 2:
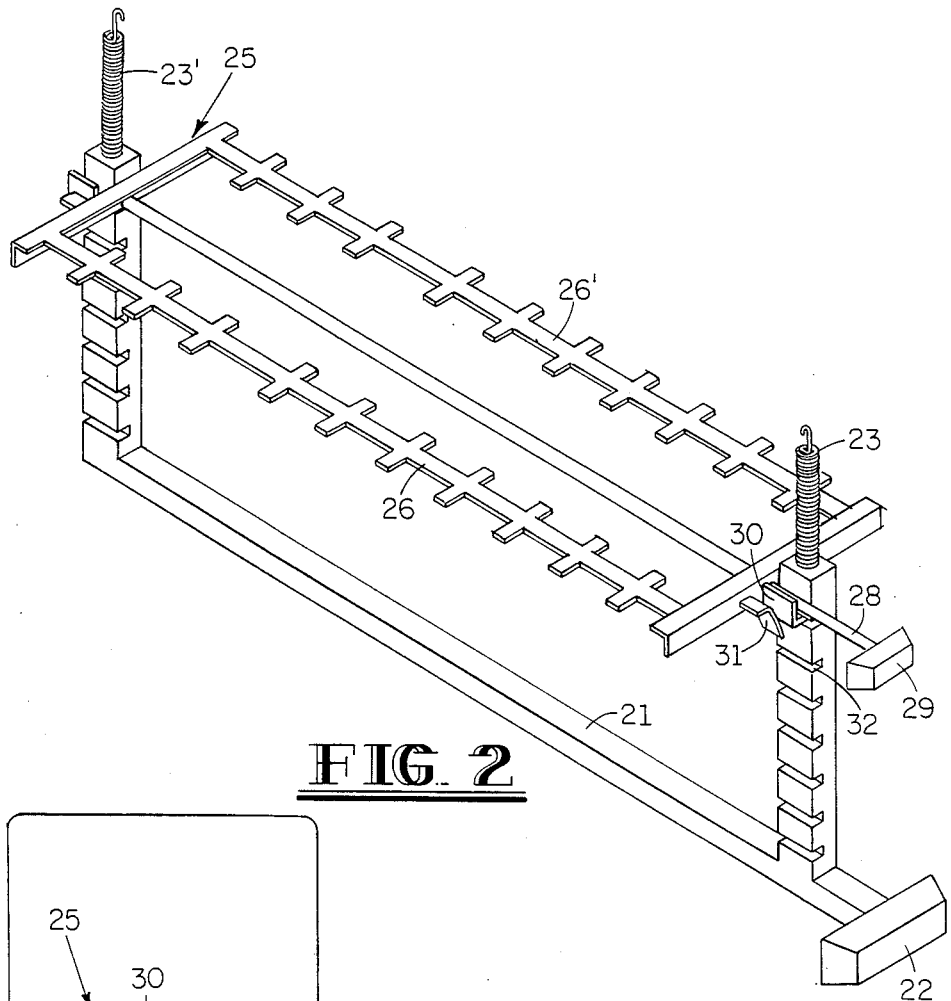
FIG. 2 depicts the depth adjustment mechanism which is variable to several different heights to accommodate various lengths of bread or tortilla slices.

FIG. 2 independently depicts the depth adjustment mechanism which is shown closely associated with bread slice carrier 21. Bread slice carrier 21 is biased with vertical springs 23 and 23', and varies between a first position, in which platforms 26 and 26' are in a raised position for loading and unloading bread onto the platforms, and a second lowered "heating" position in which the platforms are lowered into the apparatus to warm the bread. The apparatus is provided with a conventional heating mechanism which is activated when bread carrier 21 is placed in the second lowered "heating" position. The depth adjustment mechanism is variable to several different levels to accommodate various lengths of bread or tortilla slices.

To permit alternation between the "bread mode" and the "tortilla mode," depth adjustment lever 29 is situated on one external side of the apparatus, protruding from exterior case 10 (exterior case 10 is depicted in FIG.'s 1, 3 and 4). Referring back to FIG. 2, depth adjustment lever 29 connects to rod 28. Rod 28 connects lever 29 to the depth adjustment mechanism which is comprised of claw 30, leaf spring 31, and depth adjustment frame 25. Depth adjustment frame 25 is comprised of two bread loading platforms 26 and 26'. The depth adjustment mechanism is designed to vertically lower or raise platforms 26 and 26', then fix them at predetermined levels, so that the platforms hold regular slices of bread at higher vertical levels and lengthier tortillas when dropped to the lower levels.

Figure 3:
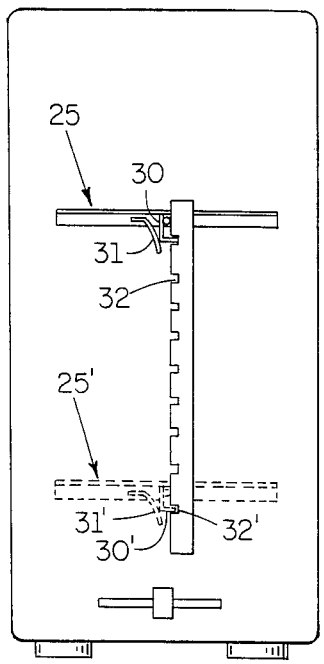
FIG. 3 is an end view of the mechanism depicted in FIG. 2 with an additional depiction of the platform in its lowermost position shown in phantom lines.

Claw 30 is biased by leaf spring 31 so that claw 30 can be removed from and re-inserted into any of a plurality of notches, one of which is shown designated with the numeral 32. FIG. 3 depicts an end view of the depth adjustment mechanism showing in solid lines, depth adjustment frame 25 in a raised position, and in phantom lines, frame 25' in its lowered position. Claw 30 is again shown biased with leaf spring 31, so that claw 30 can be removed from and re-inserted into any one of a plurality of notches, generally depicted by notch 32.

Depth adjustment frame 25', in phantom lines, depicts the lowermost position wherein claw 30' inserts into lowest notch 32'.

Because of the thin width of tortillas, merely dropping the level of platforms 26 and 26' to accommodate the greater relative length will not compensate for tilting, collapsing or buckling of the tortilla in a slot too wide for it, all of which will cause uneven heating. To counter this problem, the depth adjustment mechanism is supplemented with a side support adjustment mechanism. FIG. 1 shows side support adjustment lever 44 protruding out of case 10. Side support adjustment lever 44 is connected via shaft 43 to the interior side support adjustment mechanism. The side support adjustment mechanism is comprised of connector 42, a plurality of arms (two of which are depicted as arms 41 and 41'), and support frames 45 and 45'. Support frames 45 and 45' are supplemented with a plurality of vertical wires 46 which form "baskets" to hold different width slices of bread.

Shaft 43 extends throughout the length of the interior of case 10 to the opposite end and connects to another side support adjustment mechanism which is a duplicate of the side support adjustment mechanism described above.

Figure 4:
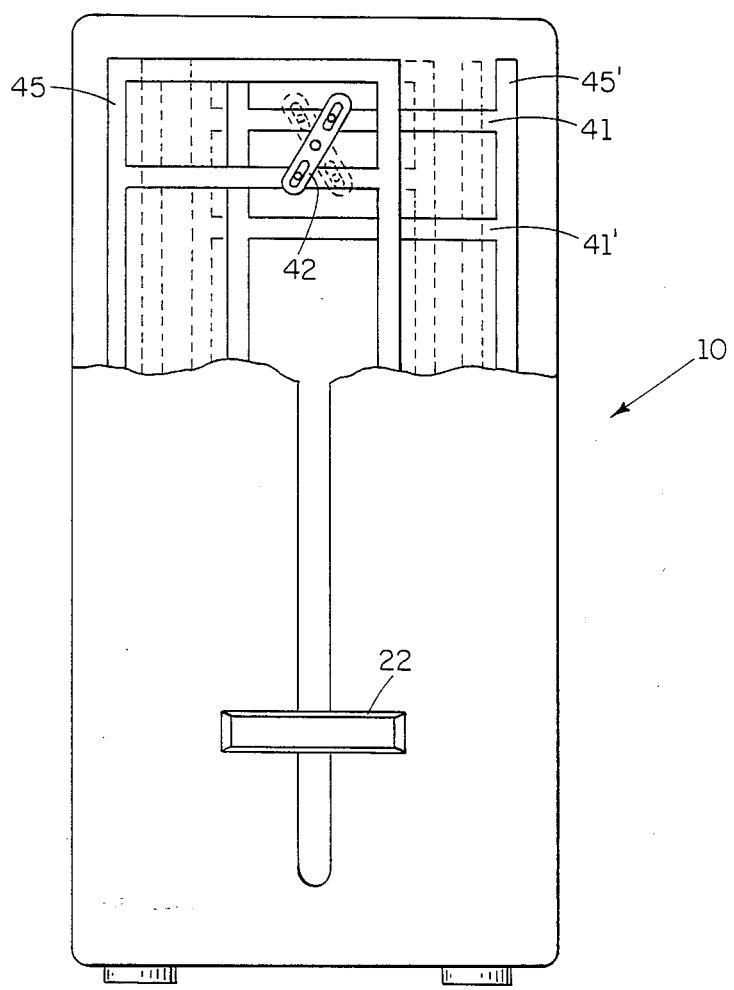
FIG. 4 is an end view with a cut-away portion showing the side-support adjustment mechanism.

FIG. 4 is an end view of the apparatus with a cut-away portion into the interior showing the side-support adjustment mechanism. Connector 42 moves support frames 45 and 45' either closer together or further apart to form, respectively, narrow side supports for the thin tortillas or wider supports for conventional sliced bread.

Thus, the side-support adjustment mechanism is designed to alternate between a wider configuration which holds conventional sliced bread to a narrower configuration which optimally holds floppy tortillas at an optimum distance from the heating elements preventing uneven heating or burning. To accomplish these side frame adjustments, connector 42 pivotally connects with at least one of a plurality of arms connected to frame 45 and with at least one of a plurality of arms connected to frame 45'. Arm 41 is shown in FIG. 4 as a sample of this overlapping, pivotal connection to connector 42. Phantom lines depict the position of the frames and arms in the narrower, "tortilla" mode.

Although the present invention has been described in terms of the foregoing presently preferred embodiment, it will be understood by those skilled in the art who have the benefit of this disclosure that changes may be made to that preferred embodiment without departing from the spirit of the present invention, the scope of which is measured by the following claims.

What is claimed is:

1. An apparatus for reheating baked goods, comprising:

an exterior casing having a plurality of loading slots at an upper end;

a bread carrier adjustably mounted within said exterior casing, said bread having a plurality of depth adjusting notches;

a bread carrier lever connected to said bread carrier such that an end of said bread carrier lever protrudes externally out of said casing;

a depth adjustment frame formed by a plurality of platforms, adjustably mounted to said bread carrier;

said plurality of platforms corresponding in number and contained within said plurality of loading slots;

a depth adjustment lever connected via a rod to said frame such that one end of said depth adjustment lever protrudes externally out of said casing;

depth adjusting meaL selectively adjusting the depth of said frame to correspond to the vertical level of a selected pair of said depth adjusting notches of said bread carrier;

adjustable side support means formed by a plurality of support frames, a plurality of support arms, and a plurality of vertical wires; and a side support adjustment lever operatively connected via a shaft to said adjustable side support means.

2. The apparatus of claim 1 wherein said depth adjusting means comprises a claw mounted to said frame and adjustably biased into locking engagement with a selected pair of said depth adjusting notches.

3. The apparatus of claim 2 wherein said claw is biased by a vertical spring.

4. The apparatus of claim 1 wherein said bread carrier lever, said depth adjustment lever, and said side support adjustment lever all protrude out of one external side of said casing.

5. The apparatus of claim 1 wherein one side of said external casing is greater than seven inches in length and seven inches in breadth.

* * * * *